United States Patent
Hehl

[11] 3,825,384
[45] July 23, 1974

[54] HYDRAULIC DRIVE MEANS FOR THE MOLD CLOSING UNIT OF AN INJECTION MOLDING OR DIE CASTING MACHINE

[76] Inventor: Karl Hehl, Siedlung 183, D-7291 Lossburg/Wurttemberg, Germany

[22] Filed: Oct. 18, 1971

[21] Appl. No.: 189,976

[30] Foreign Application Priority Data
Feb. 6, 1971  Germany............................. 2105637

[52] U.S. Cl.................. 425/137, 425/153, 425/154, 425/451.2
[51] Int. Cl.............................................. B29f 1/06
[58] Field of Search .......... 425/149, 150, 151, 154, 425/152, 153, 450, 242, DIG. 223, 136, 137; 100/53, 269 R; 91/415, 411 B, 416

[56] References Cited
UNITED STATES PATENTS

| | | | |
|---|---|---|---|
| 3,327,474 | 6/1967 | Schiffer............................ | 91/415 X |
| 3,386,133 | 6/1968 | Weiner .............................. | 425/153 |
| 3,452,397 | 7/1969 | Newton............................. | 425/153 |
| 3,669,605 | 6/1972 | Reily................................. | 425/398 |
| 3,674,400 | 7/1972 | Sauerbruch et al............. | 425/242 X |

*Primary Examiner*—J. Spencer Overholser
*Assistant Examiner*—David S. Safran
*Attorney, Agent, or Firm*—Spencer & Kaye

[57] ABSTRACT

A hydraulic drive system for the mold closing unit of an injection molding or die casting machine in which drive cylinders are provided in circuit with a pump system which alternatingly provides pressure levels in at least a low pressure range and a high pressure range for the closing unit. In one embodiment, the pump system effects a closing stroke and an opening stroke of the mold by applying a pressure in the low pressure range, and retains the closed state of the mold by applying a pressure in the high pressure range. A slide valve and a pressure setting valve are connected in circuit with the drive cylinders and the pump, with the pressure setting valve opening at a preselected limit pressure which is lower than the lower pressure range, while the slide valve is maintained in an open position during the latter portion of the closing stroke of the mold. In another embodiment, the pump system effects a closing stroke and an opening stroke of the mold by applying a pressure in the low pressure range, and retains the closed state of the mold by applying a pressure in the high pressure range with the pressure setting valve opening at a preselected limit pressure which lies slightly above the pressure ranges.

6 Claims, 2 Drawing Figures

HYDRAULIC DRIVE MEANS FOR THE MOLD CLOSING UNIT OF AN INJECTION MOLDING OR DIE CASTING MACHINE

BACKGROUND OF THE INVENTION

The present invention relates to injection molding machines, and more particularly to a hydraulic drive system for the mold closing unit of an injection molding or die casting machine for processing thermoplastics, duroplastics, elastomers or metals. The hydraulic drive system according to the present invention includes a pump system which alternatingly produces pressure levels in a low pressure range and a high pressure range with the mold being both closed (closing stroke) and opened (opening stroke) by the application of a pressure level in the low pressure range, and held closed in the high pressure range.

Mold closing units of the type in question are generally provided with safety devices which prevent closing of the mold halves under pressure in the presence of a foreign body between the mold halves. These safety devices may embody an electromechanical control means which actuates those parts of the mold closing unit which are moved in the closing direction of the unit to stop movement of the mold halves or to reverse their direction of movement. Such a device is disclosed in German Published Pat. application No. 1,230,552.

SUMMARY OF THE INVENTION

Based on this state of the art, it is one object of the present invention to provide a hydraulic drive means of the type mentioned above which can realize the desired safety effect at a minimum cost and without the requirement of a technically complex system.

It is another object of the present invention to provide a hydraulic drive system for the mold closing unit of an injection molding machine in which a pump system provides pressure levels in at least a low pressure range and a high pressure range for the closing unit with the pump system effecting a closing stroke and an opening stroke of the mold by the application of pressure levels in the low pressure range, and retaining the closed state of the mold by the application of pressure levels in the high pressure range, and in which a slide valve and a pressure setting valve are connected in circuit with the pump system with the pressure setting valve opening at a predetermined limit pressure which is lower than the low pressure range, and with the slide valve maintained in an open position during the latter portion of the closing stroke of the mold.

It is yet another object of the present invention to provide a hydraulic drive system for the mold closing unit of an injection molding machine in which a pump system provides pressure levels in at least a low pressure range and a high pressure range for the closing unit with the pump system effecting a closing stroke and an opening stroke of the mold by the application of pressure levels in the low pressure range, and retaining the closed state of the mold by the application of pressure levels in the high pressure range, and in which a pressure setting valve is connected in circuit with the pump system with the valve opening at a preselected limit pressure which lies slightly above the pressure ranges.

These and other objects are accomplished according to the present invention by the provision of a hydraulic drive system including drive cylinders, a reservoir, means connecting the drive cylinders, and a pump system. The pump system alternatingly provides pressure levels in at least a low pressure range and a high pressure range for the closing unit. The pump system effecting, in one embodiment, a closing stroke and an opening stroke of the mold by the application of pressure levels in the low pressure range, and retaining the closed state of the mold by the application of pressure levels in the high pressure range. The drive means of this embodiment also includes a line leading from the pump system to the drive cylinders for communicating the necessary pressure level from the pump system to the drive cylinders for closing the mold. This line is provided with a branch line which leads to the reservoir and in which a slide valve and a pressure setting valve are connected. The pressure valve opens at a predetermined limit pressure and is set at a pressure which is lower than the low pressure range present in the system, while the slide valve is maintained in an open position during the latter portion of the closing stroke of the mold.

With this embodiment, an additional advantage results in that the closing stroke of the mold is simultaneously attenuated in its final phase so that separate attenuation devices for the closing stroke for reducing the mechanical stresses on the mold closing unit are not required.

A further advantage is that the system pressure, which determines the speed of the opening stroke of the mold may be relatively high in the low pressure range, in any case higher than the critical pressure which permits high operating speed. Critical pressure as used herein is that pressure which develops between the mold halves as the result of a foreign body, for example, with, however, the mold halves still capable of being pressed together without destruction or damage.

A further solution of the above-mentioned problem resides in a further exemplary embodiment of the present invention in which the pump system effects a closing stroke and an opening stroke of the mold by the application of pressure levels in the low pressure range, and retains the closed state of the mold by the application of pressure levels in the high pressure range. The drive means in this embodiment also includes a line leading from the pump system to the drive cylinders for communicating the necessary pressure level from the pump system to the drive cylinders for closing the mold or the cylinder chamber fed through this line. This line is provided with a branch line which leads to the reservoir and in which a pressure setting valve is connected. The pressure valve opens at a predetermined limit pressure, with the predetermined limit pressure being slightly above the system pressure ranges.

With this embodiment, the system pressure present during the closing stroke of the mold must, of necessity, be lower than the critical pressure because the predetermined or preset limit pressure of the pressure setting valve lies somewhat above the system pressure. This solution is thus particularly suited for mold closing units in which the closing or opening of the mold requires a lower force in comparison to that required in the first exemplary embodiment. Such an embodiment, therefore, is most advantageously utilized with lighter weight machines.

DESCRIPTION OF THE PREFERRED EMBODIMENTS

Figure 1:
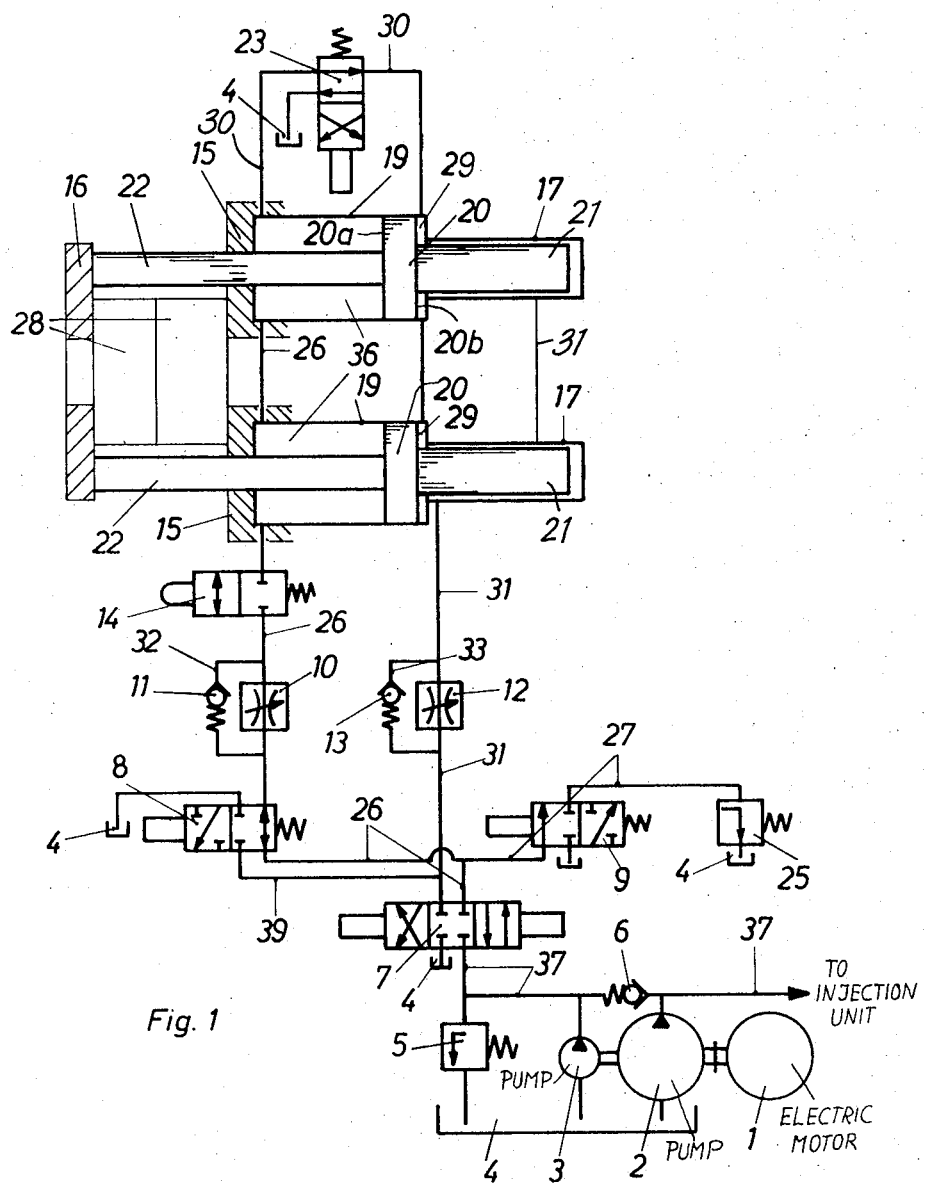
FIG. 1 is a partly schematic, partly cross-sectional illustration of the hydraulic drive means according to one embodiment of the present invention.
Figure 2:
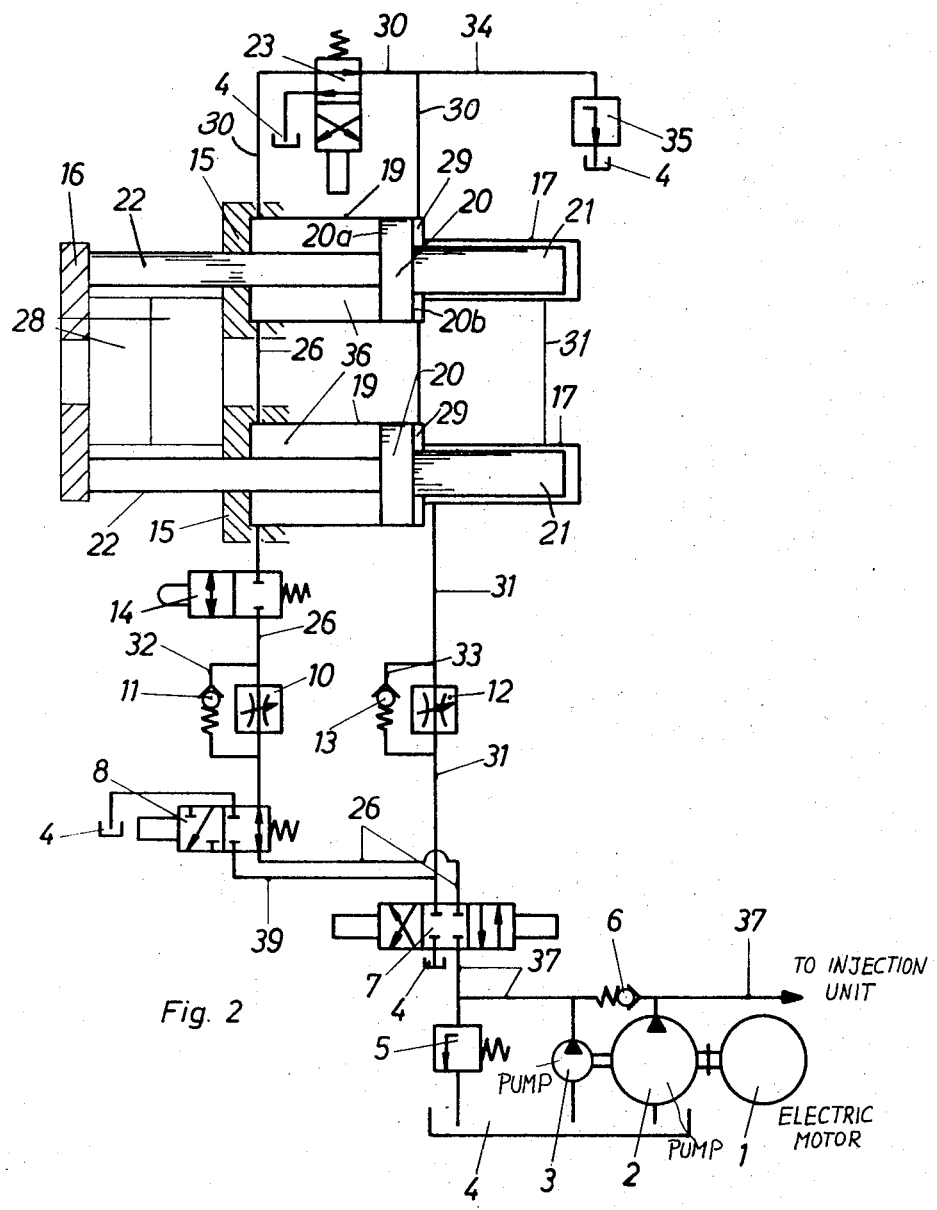
FIG. 2 is a partly schematic, partly cross-sectional illustration of the hydraulic drive means according to another embodiment of the present invention.

Referring now more specifically to FIGS. 1 and 2, the hydraulic drive system for a pair of mold halves 28 includes, in general, drive cylinders 17, pressure cylinders 19, a pump system 1, 2 and 3, a reservoir 4 and circuitry connecting the cylinders, the pump system and the reservoir.

The pump system 1–3 furnishes alternatingly pressure levels in at least two different system pressure ranges, i.e. a low pressure range and a high pressure range. In the low pressure range the mold opening and mold closing strokes are performed, while in the high pressure range the mold is held closed. The system pressure levels present during the closing and opening stroke may be of a different magnitude.

The drive cylinders 17 and the pressure cylinders 19 are fed directly by pumps 2 and 3 of the pump system 1–3. These pumps are driven by an electric motor 1. The pump 3 has a low pump output flow rate at a relatively high pressure, while the pump 2 is a control pump with a very high pump output flow rate. The pressure of the pump 2 is automatically adjusted in accordance with the pump output, with a high pump output requiring a low pressure and a low pump output requiring a high pressure. The pump system includes a main line 37. The main line 37 is connected with the reservoir 4 via a safety valve 5. The main line 37 has a branch which leads to a main slide valve 7 on the one hand, and a branch which leads to the injection unit (not shown) of the injection molding or die casting machine on the other hand. The valve 7 is shown in its mid or rest position in the drawings. It may be shifted into a left or a right operating position.

The drive cylinders 17 and the pressure cylinders 19 are utilized to close the mold by the application of pressure levels therein which are in the low pressure range of the closing unit. The pressure cylinders 19 are also utilized for producing therein the closing pressure levels which are in the high pressure range of the closing unit. The pressure cylinders 19 are provided with frontal faces 15 at one end thereof through which piston rods 22 extend and on which one mold half 28 is supported. A carrier 16 on which the other mold half 28 sits is supported on the piston rods 22 at one end thereof. Connected to the other end of the piston rods 22 are pistons 20. The pistons 20 define two charging planar surfaces (work faces) 20a, 20b. Extending away from the charging surface 20b are pistons 21. The pistons 21 are of a larger diameter than the piston rods 22.

The drive or opening cylinders 17, which open or separate the mold halves 28, are fastened coaxially to the pressure cylinders 19. The pistons 21 of the drive cylinders 17 form along with the piston rods 22 and the pistons 20 of the pressure cylinders 19, a movable unit.

The pressure cylinders 19 form along with the piston rods 22 and the pistons 20 annular chambers 36, while the pressure cylinders 19 form along with the pistons 20 and 21 annular chambers 29. The chambers 36 and 29 will be referred to hereinafter as the front and rear chambers, respectively.

The chambers 36, 29 are connected together by a connecting line 30. Included within the connecting line 30 is a switch valve 23 which has two operating positions. In the one operating position (shown in FIG. 1), the valve 23 opens the connecting line 30, whereby communication is maintained between the front chambers 36 on the one hand and the rear chambers 29 on the other hand, while in the other operating position (blocking position) the valve 23 connects the rear chambers 29 to the reservoir 4 and blocks the connecting line 30 with respect to the front chambers 36.

A line 26 extends from the valve 7 to an auxiliary slide valve 8. The valve 8 may be connected into the circuit of the valve 7 by means of a selector switch (not shown). When the valve 8 is connected into the circuit of the valve 7 it will be synchronously controlled therewith, as will be described below. If the auxiliary valve 8 is controlled in synchronism with the main valve 7, that is, when the valve 8 is connected in circuit with the valve 7, a mode of operation II for the hydraulic drive system results. If the valve 8 is not in circuit with the valve 7, but is instead in a by-pass position, as shown in the drawings, a mode of operation I for the hydraulic drive system results.

When the system is set to the mode of operation I, the mold is closed (closing stroke) for both the embodiments and is held closed and opened (opening stroke) as follows: The closing stroke is effected in that both pumps 3, 2 convey a pressure medium, for example, oil via the main line 37, the main slide valve 7 (which is now in its left operating position), line 26, the auxiliary valve 8, which is in the by-pass position, a choke 10, a safety slide valve 14, which is shifted toward the right to place it into an operating position (in the drawings it is shown in a blocked position), the front cylinder chambers 36, and via the connecting line 30, into the rear cylinder chambers 29 of the pressure cylinders 19. The sytem pressure here lies in the low pressure range, preferably between 4 and 60 atmosphere gauge. It is noted that the hydraulic path extending from the pumps 2, 3 to the cylinders 19 and including lines 37, 26 constitutes a "first conduit means", whereas the hydraulic path extending from the pumps 2, 3 to the cylinders 17 and including lines 37, 31 constitutes a "second conduit means". The force for the closing stroke results from the fact that the pistons 20 are charged on both surfaces 20a, 20b and that because of the difference in surface area between the front and rear charging surfaces 20a, 20b respectively, of these pistons 20 the forces which result from the applied pressures are different giving rise to a force differential toward the right. The speed of the closing stroke is set by the choke 10. During the closing stroke, the hydraulic oil in the drive or opening cylinders 17 is emptied via a line 31, a branch line 33, a check valve 13 and the main valve 7 into the reservoir 4. As soon as the mold is closed, a closing pressure of between 100 and 250 atmosphere gauge is built up by the two pumps 2, 3 with the aid of the valve 23 in connecting line 30. This pressure buildup is accomplished by placing the valve 23 from its shown position into a blocking position in which the connecting line 30 is blocked with respect to the front cylinder chambers 36, while the rear cylinder chambers 29 are short-circuited to the reservoir 4. In this manner the molds 28 are maintained closed (that is, clamped to one another) by a greater pressure than the pressure prevailing during the closing stroke, since in the blocking position of the valve 23 the pressure generated by the pumps 2, 3 is applied only to the piston faces 20a and there is no counterpressure exerted on the piston faces 20b. Once the closing pressure is developed, the pump 2 can be used for other purposes, e.g. for charging a hydraulic cylinder of the injection unit to perform the injection process. The closing pressure is maintained by pump 3 at a high level. A check valve 6 in the line 37 between the pumps 3, 2, limits the system pressure from being communicated through main line 37 to the injection unit.

During the opening stroke, the drive or opening cylinders 17 are charged with pressurized oil by the pump system 1-3 via the main line 37, the main slide valve 7, which is shifted toward the right an operating position, the line 31 and a choke 12. The speed of the opening stroke is selectively varied by the choke 12. The oil displaced during the opening stroke from the front cylinder chambers 36 is fed to the rear cylinder chambers 29 via the again open connecting line 30. Because of the difference in diameter of the piston rods 22 and the pistons 21, the volume of the front chambers 36 is greater than that of the chambers 29. The amount of oil which cannot be accommodated in the chambers 29, because of the volume difference passes through the line 26, the valve 14, the branch line 32, the check valve 11, the by-pass of auxiliary valve 8, and the main valve 7 into the reservoir 4. The system pressure during the opening stroke is in the low pressure range.

In the mode of operation II of the drive system, the mold is closed and held closed in the same manner as in the mode of operation I. During the mode of operation II, only the opening stroke is effected differently: During the opening stroke in this case, the oil which is displaced from the pressure cylinders 19 is not diverted to the reservoir 4 but is instead delivered through the auxiliary valve 8 into the drive or opening cylinders 17. The auxiliary valve 8, which has been connected into the circuit of the main valve 7 with the aid of the selector switch and which is controlled in synchronism therewith, is actuated by the same electrical pulse which switches the main valve 7 to the "closing stroke" or "opening stroke" position, respectively. The auxiliary valve 8 is in the by-pass position during the pulse for the "closing stroke", as shown in FIGS. 1 and 2, while it is shifted to its other operating position, i.e., feed position, during the pulse for the "opening stroke". During each operating cycle of the mold closing unit, which consists of the closing stroke, the pressure period and the opening stroke, the auxiliary valve 8 is shifted once from the by-pass position to the feed position. During the closing stroke and during the pressure period the auxiliary valve 8 is in the by-pass position and during the opening stroke it is in the feed position. In this feed position the oil which has been displaced from the cylinder chambers 36 passes through the line 26, the branch line 32, the check valve 11, the auxiliary valve 8, the line 39, the line 31 and through choke 12 into the drive or opening cylinders 17. During the opening stroke, therefore, all cylinder chambers are thus connected together and are subject to the system pressure.

The opening stroke thus results from an effective piston surface of the pressure pistons 20, which correspond to the difference of the cross section of the piston rods 22 and the pistons 21, as described above, plus the charged rear surfaces of the pistons 20.

The feeding of the quantity of oil which has been displaced from the cylinder chambers 19 into the drive or opening cylinders 17 gives rise to a substantial acceleration of the opening stroke. For example, practical experience has shown that in one case an operating frequency of 25 operating cycles per minute were realized with the mode of operation I and 30 cycles per minute with the mode of operation II.

A safety valve 14 is included in the line 26 and is in any case directly controllable in dependence on the position of the protective cover (not shown) for the mold 28, so that when the protective cover is in the protective position the valve 14 is in the open position, while when the protective cover has been wholly or partially removed from the mold, the valve is in the closed position.

The hydraulic devices (safety devices) which prevent damage to the mold during the closing stroke of the mold, if a foreign body should interfere between the mold halves will now be described in more detail. The two embodiments shown in FIGS. 1 and 2 differ only with respect to these safety devices.

In the embodiment according to FIG. 1, the line 26 leading from the main valve 7 to the cylinder chambers 36 of the pressure cylinders 19 is provided with a branch line 27 leading to the reservoir 4. In the branch line 27, a valve 9 is included which is connected to a pressure setting valve 25. The valve 9 is controlled to be open only during the last phase of the closing stroke of the mold with the aid of a final run switch (not shown) which operates in dependence on the movement of the movable mold half. At the moment when the valve 9 is opened, the system pressure drops to the set limit pressure of the pressure setting valve 25 which in turn is lower in comparison to the system pressure. The set limit pressure of the pressure setting valve 25 corresponds to a critical pressure or lies below the critical pressure. The critical pressure as used herein is that maximum pressure with which the mold halves can be pressed together without the occurrence of damage or destruction from the presence of a foreign body between the mold halves. Normally the system pressure lies substantially above the critical pressure during the closing stroke, so that the desired high speed results by permitting the system pressure to be maintained until the last phase of the closing stroke. The system pressure representing a relatively strong force, so that in all cases, i.e., for heavy assemblies, the mold can be quickly and safely brought into the closed position. In the described safety device according to the embodiment of FIG. 1, damage from the presence of a foreign body between the mold halves is not only definitely avoided but also the closing stroke is attenuated in the final phase. This attenuation results from the fact that the system pressure drops substantially during the closing stroke in the final phase so that the closing stroke is decelerated.

In the embodiment according to FIG. 2, the desired safety effect is realized in that the connecting line 30 which couples — dependent upon the position of the switch valve 23 — the chambers 36 to the chambers 29, is provided with a branch line 34, into which a pressure setting valve 35 is inserted. The branch conduit 34 merges into the connecting line 30 at a location which is between the switch valve 23 and the chambers 29. The adjustable limit pressure of the pressure setting valve 35 is so adjusted that it lies slightly above the system pressure present during the closing stroke. This means that the system pressure must of necessity lie below the critical pressure. As it may be further observed in FIG. 2, the switch valve 23, when it maintains communication between the chambers 36 and 29 for the mold closing stroke (lower pressure range), also maintains communication between the relief valve 35 and the chambers 36. Thus, in this case, the relief valve 35 is operatively (hydraulically) connected to the hydraulic system. If, on the other hand, the switch valve 23 is in its setting where it blocks communication between the chambers 36 and the chambers 29 for the mold clamping operation (higher pressure range), then the switch valve 23 simultaneously blocks communication between the relief valve 35 and the chambers 36. Thus, in this case, the relief valve 35 is operatively disconnected (hydraulically blocked) from the hydraulic system. The protective device according to FIG. 2 is thus particularly suited for light-weight mold closing units where moving the mold into the closed position does not require too much force or for cases where high speed of the closing stroke is not so important. If with this safety device a foreign body is disposed between the mold halves, the system pressure is set to the limit pressure set in the pressure setting valve 35. Removal of the pressurized oil to the reservoir 4 prevents the pressure with which the mold halves are pressed together when a foreign body is present from rising beyond the critical pressure.

It shall finally be noted that all the valves of the hydraulic drive system are electromagnetically actuatable slide valves which are shifted into or out of the circuit of the system by means of selector switches (not shown).

It will be understood that the above description of the present invention is susceptible to the various modifications, changes and adaptations, and the same are intended to be comprehended within the meaning and range of equivalents of the appended claims.

I claim:

1. A hydraulic drive system for the mold closing unit of an injection molding or die casting machine, comprising in combination:
   a. a pump system for supplying hydraulic pressure for said drive system;
   b. a cylinder assembly including a first cylinder, a first piston slidably received in said first cylinder and dividing the latter into separate first and second chambers, said first piston having a first work face bounding said first chamber, a second work face bounding said second chamber, said first work face having an area greater than the area of said second work face, said first piston further having a piston rod operatively connected to said mold closing unit; said cylinder assembly further including a second cylinder axially adjoining said first cylinder and a second piston slidably received in said second cylinder and affixed to said first piston to form a unitary structure therewith, said second piston having a cross section larger than that of said piston rod, said second piston extending from said second work face;
   c. a first conduit means for connecting said pump system with said first chamber of said first cylinder for applying hydraulic pressure to said first cylinder;
   d. a second conduit means for connecting said pump system with said second cylinder for applying hydraulic pressure to said second piston to urge the latter in a mold opening direction;
   e. a hydraulic connecting line for connecting said first and second chambers of said first cylinder to one another;
   f. a reservoir means;
   g. a switch valve connected in said connecting line, said switch valve having a first position for maintaining hydraulic communication between said first and second chambers through said connecting line, said pump system supplying hydraulic pressure from said first conduit means to both said first and second chambers when said switch valve is in said first position so that said first piston is urged in a mold closing direction with a relatively small force formed by the difference of the forces acting on said first and second work faces, said switch valve having a second position maintaining communication between said second chamber and said reservoir means and simultaneously blocking said connecting line toward said first chamber, said pump system supplying hydraulic pressure from said first conduit means solely to said first chamber when said switch valve is in said second position so that said piston is urged in said mold closing direction with a relatively large force;
   h. a sole main valve connected in said first and second conduit means, said sole main valve having a first or mold closing position for establishing communication between said pump system and said first cylinder through said first conduit means and a second or mold opening position for establising communication between said pump system and said second cylinder through said second conduit means; and
   i. an auxiliary valve connected in said first conduit means, said auxiliary valve having a first position for establishing communication between said first cylinder and said reservoir means through said main valve when said main valve is in its second position and for establishing communication between said first cylinder and said pump system through said main valve when said main valve is in its first position, said auxiliary valve having a second position for establishing communication between said first cylinder and said pump system through said main valve when said main valve is in its second position.

2. A hydraulic drive system as defined in claim 1 wherein said auxiliary valve and said main valve are movable in synchronism between their respective first and second positions.

3. A hydraulic drive system as defined in claim 2 wherein said auxiliary valve and said main valve are controlled in synchronism by an electrical pulse which switches said main valve to its said second position and said auxiliary valve to its second position and by an electric pulse which switches said main valve and auxiliary valve to their said first positions.

4. A hydraulic drive system as defined in claim 1, further comprising a choke in at least one of said first and second conduit means, and a check valve in parallel with said choke for passing fluid in a direction away from the cylinder with which said choke communicates.

5. A hydraulic drive system as defined in claim 1 wherein said pump system comprises a control pump for automatically furnishing a fluid flow at a low pressure with a high flow output and at a high pressure with a lower flow output.

6. A hydraulic drive system for the mold closing unit of an injection molding or die casting machine, comprising in combination:
   a. a pump system for supplying hydraulic pressure for said drive system;
   b. a cylinder assembly including at least one cylinder a piston slidably received in said cylinder and dividing the latter into separate first and second chambers, said piston having a first work face bounding said first chamber, a second work face bounding said second chamber, said first work face having an area greater than the area of said second work face, said piston further having a piston rod operatively connected to said mold closing unit;
   c. a first conduit means for connecting said pump system with said first chamber of said cylinder for applying hydraulic pressure to said cylinder;
   d. valve means in said first conduit means for selectively establishing or blocking hydraulic communication between said pump system and said cylinder;
   e. a hydraulic connecting line for connecting said first and second chambers to one another;
   f. a reservoir means;
   g. a switch valve connected in said connecting line, said switch valve having a first position for maintaining hydraulic communication between said first and second chambers through said connecting line, said pump system supplying hydraulic pressure from said first conduit means to both said first and second chambers when said switch valve is in said first position so that said piston is urged in a mold closing direction with a relatively small force formed by the difference of the forces acting on said first and second work faces, said switch valve having a second position maintaining communication between said second chamber and said reservoir means and simultaneously blocking said connecting line toward said first chamber, said pump system supplying hydraulic pressure from said first conduit means solely to said first chamber when said switch valve is in said second position so that said piston is urged in said mold closing direction with a relatively large force;
   h. a hydraulic branch conduit connected to said connecting line at a location between said switch valve and said second chamber, said switch valve, when in said first position, maintains communication between said hydraulic branch conduit and said first chamber, said switch valve, when in said second position, blocks communication between said hydraulic branch conduit and said first chamber; and i. a relief valve connected in said hydraulic branch conduit for limiting said relatively small force to a predetermined maximum safe value by controlling said branch conduit in response to the magnitude of the hydraulic pressure prevailing therein; said relief valve being rendered effective solely in dependence of the position of said switch valve, said relief valve being rendered effective when said switch valve is in said first position and said relief valve being ineffective when said switch valve is in said second position.

* * * * *

UNITED STATES PATENT OFFICE
CERTIFICATE OF CORRECTION

Patent No. 3,825,384　　　　　　　Dated　July 23rd, 1974

Inventor(s) Karl Hehl

It is certified that error appears in the above-identified patent and that said Letters Patent are hereby corrected as shown below:

In the heading of the patent, between lines 8 and 9, insert --Oct. 17, 1970　Germany..... 2051083--, in the ABSTRACT, line 14, change "lower pressure range" to --low pressure range--

Column 1, line 27, change "discloed" to --disclosed--;

Column 5, line 21, delete "an".

Signed and sealed this 5th day of November 1974.

(SEAL)
Attest:

McCOY M. GIBSON JR.　　　　　　C. MARSHALL DANN
Attesting Officer　　　　　　　Commissioner of Patents